United States Patent [19]

Muench

[11] 3,831,393

[45] Aug. 27, 1974

[54] CONTROL ARRANGEMENT FOR ABSORPTION REFRIGERATION SYSTEM

[75] Inventor: Paul W. Muench, Medford Lakes, N.J.

[73] Assignee: Borg-Warner Corporation, Chicago, Ill.

[22] Filed: Dec. 26, 1972

[21] Appl. No.: 318,133

[52] U.S. Cl.................................. 62/141, 62/476
[51] Int. Cl........................................... F25b 15/06
[58] Field of Search............. 62/103, 141, 476, 483

[56] References Cited
UNITED STATES PATENTS

| | | | |
|---|---|---|---|
| 3,019,616 | 2/1962 | Papapanu | 62/141 |
| 3,279,206 | 10/1966 | Leonard, Jr. | 62/141 |
| 3,717,007 | 2/1973 | Kuhlenschmidt | 62/476 X |
| 3,742,728 | 7/1973 | Mamiya | 62/483 X |

Primary Examiner—William F. O'Dea
Assistant Examiner—Peter D. Ferguson
Attorney, Agent, or Firm—Donald W. Banner

[57] ABSTRACT

An absorption refrigeration system featuring a damper device between the evaporator and the absorber and controlling the pressure drop of fluid flowing from the evaporator to the absorber.

10 Claims, 7 Drawing Figures

PATENTED AUG 27 1974

CONTROL ARRANGEMENT FOR ABSORPTION REFRIGERATION SYSTEM

BACKGROUND AND SUMMARY OF THE INVENTION

This invention relates to an absorption refrigeration system and more particularly to an absorption refrigeration system incorporating improved means for controlling evaporator performance by controlling refrigerant temperature limits in the evaporator.

In conventional lithium bromide refrigeration systems, there may be times when it is desirable to control the evaporator pressure especially when absorber conditions create a lower pressure than desired, such as may result from crystallization difficulties and the effect of varying condensing water temperature on the capacity of the system and refrigerant temperature.

The present invention is directed to an improved system in which movable and modulating dampers are located between the evaporator and absorber to control the system by introducing a controllable pressure drop between the evaporator and the absorber to thereby effect operation of the evaporator under controlled conditions and independtly of the absorber.

In describing the system, reference will be made herein to a typical absorption refrigeration apparatus in which the generator and condenser are arranged in one shell, and the evaporator and absorber are arranged in another shell. It is obvious, however, that absorption refrigeration machines may take many other forms and the description should not necessarily be restricted to the particular arrangement described. Also, while the specification refers to an absorption refrigeration system of the type using lithium bromide as the absorbent solution, many other absorbent-refrigerant combinations are known; and it is not intended that the invention be limited to this particular system.

DESCRIPTION OF THE PREFERRED EMBODIMENT

Figure 1:
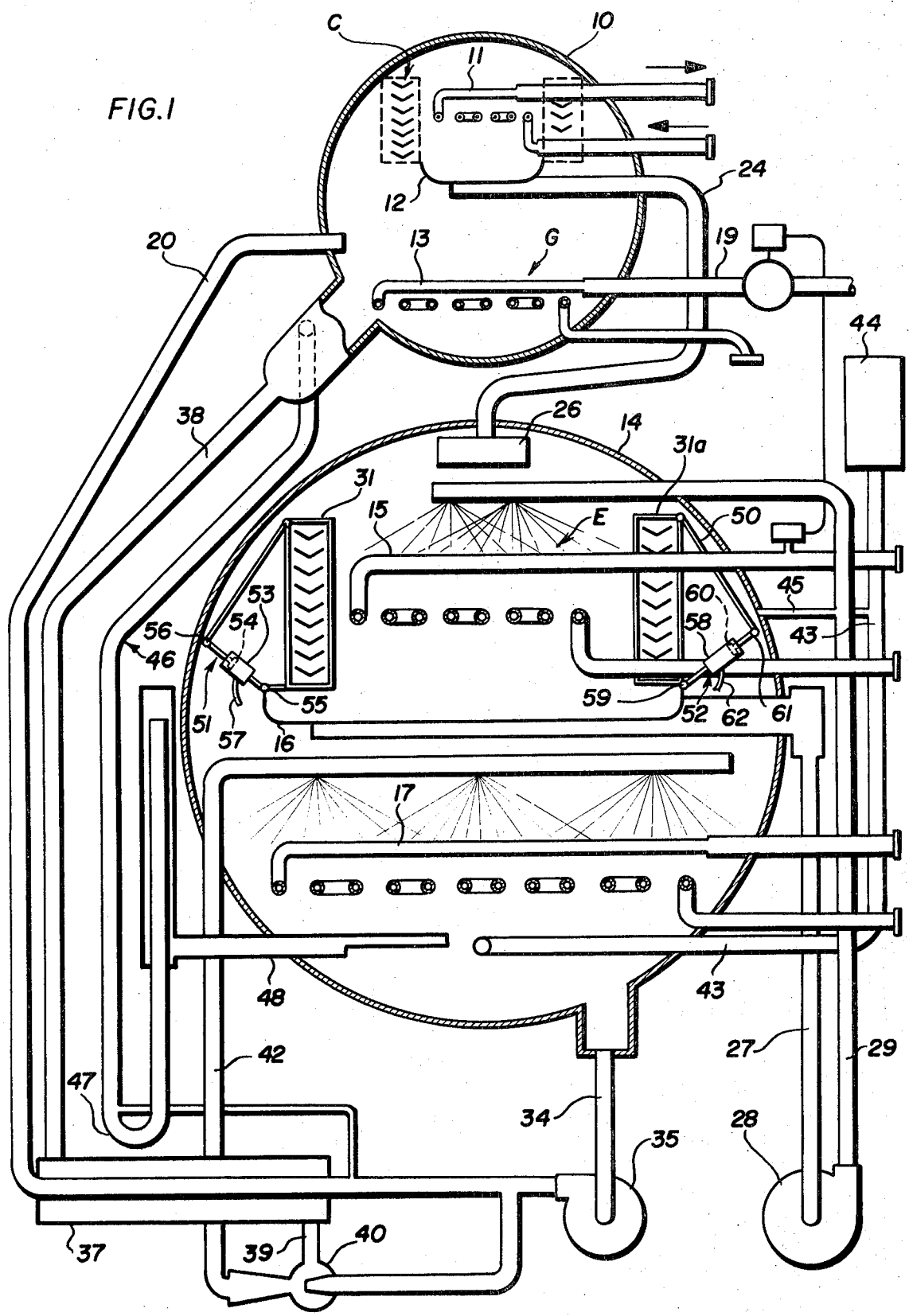
FIG. 1 is a schematic illustration of an absorption refrigeration system incorporating the principles of the present invention.

The absorption refrigeration machine shown in FIG. 1 is arranged in a two-shell configuration. The upper shell 10 includes a tube bundle 11 which cooperates with a pan 12 to provide a condenser C; and a second tube bundle 13 cooperates with the lower portion of shell 10 to provide a generator G. In the lower shell 14, tube bundle 15 is arranged above a pan 16, which cooperate to provide an evaporator E; and a fourth tube bundle 17, located underneath pan 16, is associated with the absorber A.

As is well understood by those skilled in the art, the operation of an absorption refrigeration machine depends on a refrigerant that boils at a temperature below that of a liquid being chilled and an abosrbent possessing great affinity for the refrigerant. In the particular system to be described, the refrigerant is water and the absorbent is an aqueous solution of a hygroscopic salt such as lithium bromide. While some absorption machines actually circulate the refrigerant directly to a load, the apparatus illustrated herein uses a secondary heat exchange medium (usually water) which is chilled in the evaporator by indirect contact with the refrigerant and then circulated to and from the load.

Figure 2:
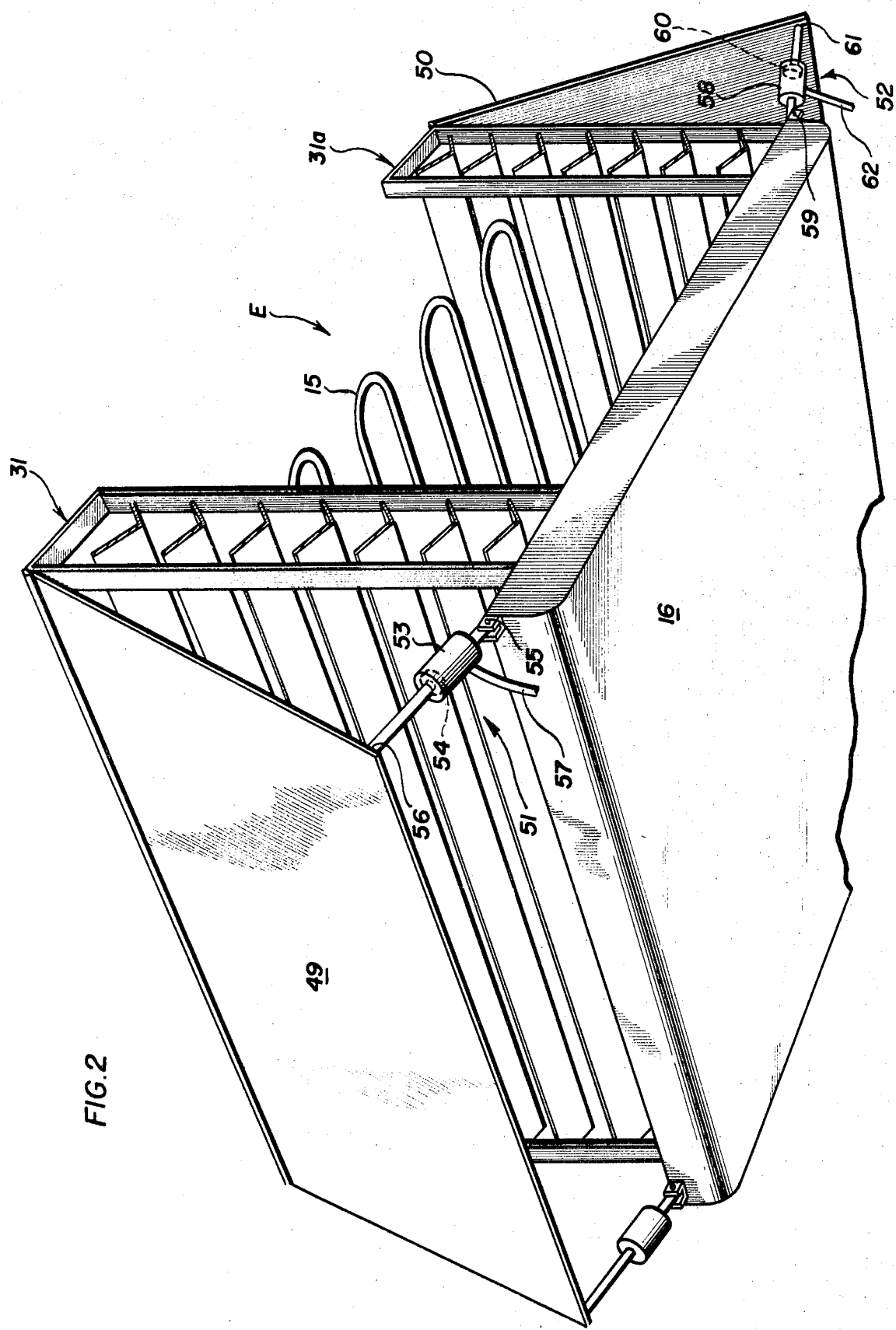
FIG. 2 is a detailed perspective illustration of the damper control arrangement.

The generator G, the condenser C, the evaporator E and the absorber A are connected to provide a closed-circuit, continuous-cycle refrigeration system. Relatively dilute absorbent solution (containing about 59% LiBr by weight) is circulated to the generator G through a conduit 20 where it contacts tube bundle 13, to which a heating medium, such as steam or hot water, is supplied through a line 19. Under the pressure conditions existing in the upper shell (about 1/10 atmosphere) the solution boils, releasing water vapor and concentrating the solution. The water vapor boiled off in the generator flows upwardly to the condenser C where the vapor is brought into contact with tube bundle 11 through which cooling water (from a cooling tower or the like) is circulated. The refrigerant condensing on the tube bundle is collected in pan 12 and forwarded through a conduit 24, which contains an orifice 25 to maintain the proper pressure differential between the shells, to a refrigerant distributor 26 located above the evaporator. The refrigerant discharged from distributor 26, mostly liquid but containing some vapor, flows downwardly in contact with the evaporator tube bundle 15, commonly referred to as the chilled water coil, where it boils and abstracts heat from the water circulating therethrough, dropping the temperature of the water from approximately 54°F. as it is returned from the load (at full capacity) to approximately 44°F. Unevaporated refrigerant collects in pan 16 and flows through one side of the lower shell and a conduit 27 to the inlet side of a refrigerant pump 28. From there, it is circulated back to the evaporator through a conduit 29 and a spray header 30 positioned above the chilled water coil 15. The water vapor formed in the evaporator by contact with the chilled water coil passes through eliminators 31 and 31a employed to reduce the amount of liquid refrigerant carried into the absorber, and sweeps downwardly into the absorber section A where it is absorbed in the solution, the heat of solution being removed by contact with the absorber tube bundle 17. As seen in FIGS. 1 and 2, the eliminators 31 and 31a are of conventional design and are disposed at opposite ends of a rectangular box-like container which houses the chilled water coil 15 and has its open top positioned below the header 30 and its bottom closed by the pan 16.

As the water vapor is dissolved in absorbent solution, the solution naturally becomes more dilute and is withdrawn through a dilute solution line 34 to the inlet side of a generator pump 35. The relatively cool, dilute solution to be forwarded to the generator passes through a solution heat exchanger 37 where it is brought into heat exchange relation with the hot, concentrated solution passing from the generator through a conduit 38. The relatively concentrated solution is cooled through an appreciable range, withdrawn from solution heat exchanger 37 through a conduit 39, and introduced into a stream of relatively dilute solution (at a point remote from the inlet portion of dilute solution line 34) flowing into an eductor 40 where it mixes with the dilute solution to form a solution of intermediate strength (62–63 percent LiBr). This mixture is forwarded by eductor 40 via a line 42 to the absorber spray header 32. The intermediate strength solution of lithium bromide is continuously distributed over the absorber tube bundle 17, which is supplied with cooling water and usually connected in series with the condenser tube bundle 11.

To withdraw non-condensible gases from the system, a purge unit is provided comprising a suction pipe 43 extending along the lower portion of the absorber A and outwardly of the absorber, the pipe rising vertically upwardly and terminating in a purge chamber 44. A relief line 45 connects the pipe 43 to the interior of the shell 14. The purge chamber contains a vacuum pump (not shown) connected to the pipe 43.

An automatic decrystallization arrangement is provided by a pipe 46 having a U-shaped portion 47 positioned exteriorly of the shell 14 and a horizontal portion 48 extending into the shell 14 and adjacent the lower portion of the absorber A, the upper end of one arm of the U-shaped portion 47 extending into the upper shell 10.

The present invention is directed to a control arrangement for an absorption refrigeration system to control refrigerant temperature limits in the evaporator and thereby the performance of the evaporator. The control arrangement comprises means to control the volume of water vapor flowing from the evaporator E to the absorber A and thereby the performance of the refrigeration system. More particularly, the control means includes dampers 49 and 50 pivotally mounted at their upper ends on the edges of the top walls of the rectangularly-shaped eliminators 31 and movable to control the quantity of water vapor flowing downwardly from the eliminators into the absorber section A to be absorbed in the solution. The dampers 49 and 50 are located between the evaporator and absorber sections E and A of the lower shell and are movable to throttle, and thereby modulate, the flow of water vapor from the evaporator section E to the absorber section A to thereby control the evaporator performance by limiting the evaporator pressure when absorber conditions create a lower pressure than desired, the dampers' operation imposing a pressure drop permitting the evaporator section to be operated under controlled conditions at pressures above the pressure prevailing in the absorber section.

Actuators for the dampers may be any suitable devices effective to pivotally move the dampers, such devices being electrically, hydraulically, or pneumatically operated; if hydraulically operated, the hydraulic fluid may be either the refrigerant, or the liquid absorbent, or a combination of the refrigerant and liquid absorbent. Suitable devices for this purpose are identified at 51 and 52. The device 51 is in the form of a cylinder 53 and a piston 54, the cylinder being pivotally connected at 55 to the upper edge of the pan 16 and the piston being pivotally connected at 56 to the bottom edge of the damper 49, the cylinder having a tube 57 for the flow of actuating fluid to and from the cylinder to actuate the piston and thereby the damper. Device 52 is identical to device 51 and has its cylinder 58 pivotally connected at 59 to the upper edge of pan 16 and its piston 60 pivoted at 61 to the bottom edge of damper 50, a tube 62 extending into the cylinder for the flow of actuating fluid to move the piston. Upon withdrawal of actuating fluid from the cylinders 53 and 58, the weight of the dampers causes the dampers to gravitate toward the pan 16.

Figure 3:
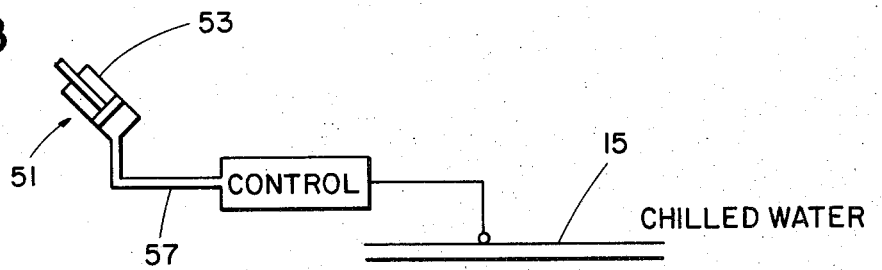
FIG. 3 is a schematic diagram illustrating a damper to be controlled in response to chilled water temperature.
Figure 4:
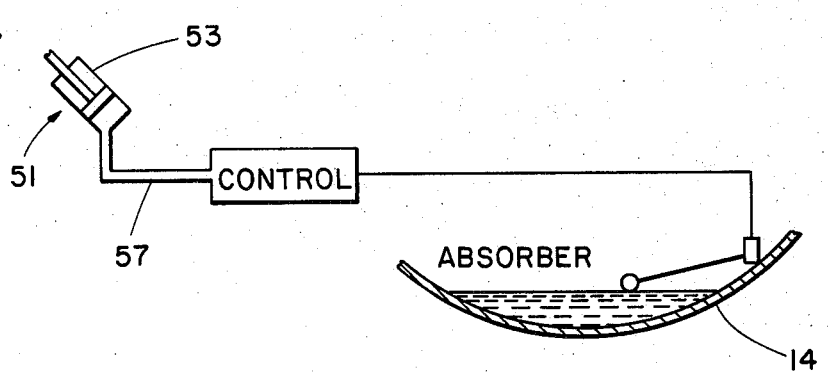
FIG. 4 is a schematic diagram showing the damper controlled in response to suction level in the absorber.
Figure 5:
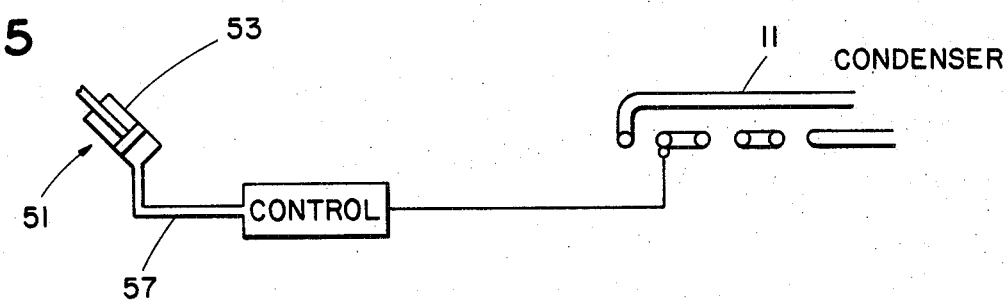
FIG. 5 is a schematic diagram showing the temperature controlled in response to condensing water temperature.
Figure 6:
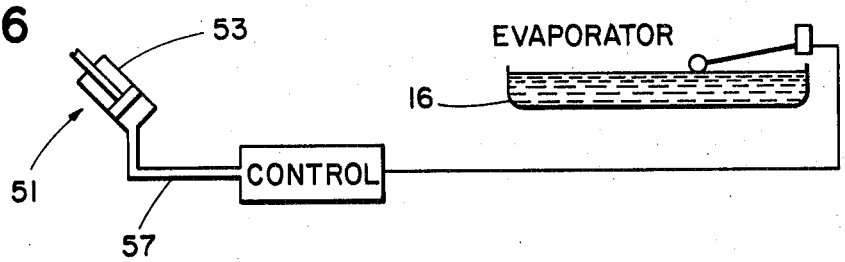
FIG. 6 is a schematic diagram showing the temperature in response to the level of refrigerant in the evaporator.
Figure 7:
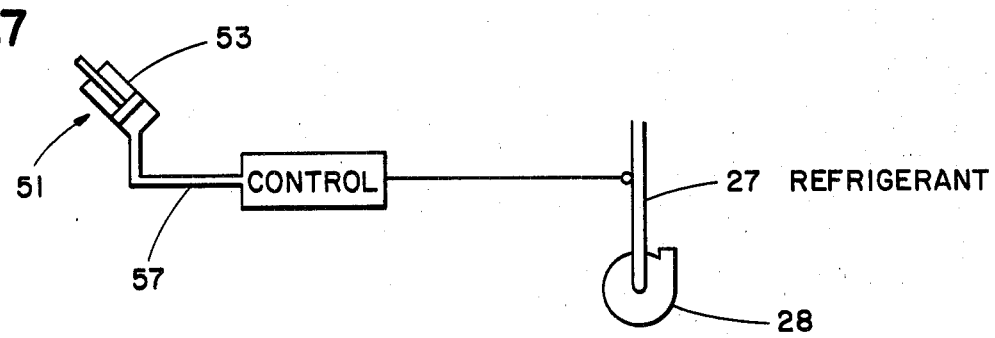
FIG. 7 is a schematic diagram showing the temperature controlled in response to the temperature of refrigerant circulating in the refrigerant circuit.

With the damper throttling device located between the evaporator and the absorber, the evaporator performance is controlled in a manner which is quite different from that which would prevail without the use of a damper. The damper may be used for several purposes. For example, it may be used to prevent the refrigerant temperature from dropping to an unacceptable low level to prevent a freeze-up condition in the event the condensing water temperature drops suddenly. Also the damper may be brought into operation when the solution concentration would drop to a point where the system might run out of refrigeration, such as with low water temperature. Also, it may be used to minimize objectional cycling without the necessity for excessive throttling of the heat input to the generator. Such cycling may be due to varying condenser water temperatures or to excessive cycling of the condenser water fan. Since the capacity requirements and their influence on the system may be measured and controlled from different variables, it will be obvious to one skilled in the art to utilize a control signal from any of several operating inputs. For example, the damper may be controlled in response to (1) refrigerant temperature flowing through line 27 as shown in FIG. 7; (2) chilled water temperature as measured at line 15 (FIG. 3); (3) the solution level in the absorber (FIG. 4) or refrigerant level in the evaporator (FIG. 6), either as a direct control or as an override; or (4) condensing water temperature, either directly or from an override (FIG. 5).

As shown in the drawing, the damper actuator 53 is adapted to receive hydraulic fluid through line 57 in response to an input signal from one of a number of operational conditions. Since it is obvious to one skilled in the art that such input signals can be generated by one of several variables, e.g. solution level in the absorber, chilled water temperature, refrigerant temperature or condenser water temperature, such means are not shown individually in the drawing, it being understood that any of the hydraulic control lines may be connected to appropriate transducers adapted to receive such signals.

While the damper has been described in terms of continuously modulating over the range at which it is possible to control the flow from the evaporator to the absorber other systems may obviously be used, for example, the position may be stepped to move in two or more discrete positions in response to a controlling signal.

The movement of the dampers effectively controls the volume of water vapor passing from the evaporator to the absorber to thereby control the refrigerant temperature limits in the evaporator and thus control evaporator performance. The vapor pressure of the refrigerant in the evaporator determines the temperature produced by vaporization of the refrigerant, thus affecting the degree of cooling produced by the refrigeration system.

Among the several advantageous features of this control arrangement is its effectiveness in preventing the refrigerant temperature from dropping to an unacceptable low temperature close to the freezing condition, as might occur when the condensing water temperature takes a sudden drop, or when the solution concentration drops to the point where the system is in danger of running out of refrigerant as may be occasioned by an excessively low condensing water temperature. The arrangement is also useful when it is desired to control objectionable cycling without excessive throttling of the steam valve, the cycling arising from the cumulative effect on chilled water and temperatures arising from quickly changing loads.

While this invention has been described in connection with a certain specific embodiment thereof, it is to be understood that this is by way of illustration and not by way of limitation; and the scope of the appended claims should be construed as broadly as the prior art will permit.

What is claimed is:

1. In an absorption refrigeration machine of the type including a generator, a condenser, an evaporator and an absorber connected in a closed-circuit, continuous-cycle refrigeration system employing water as the refrigerant and an aqueous solution of a hygroscopic salt as the absorbent, the improvement residing in means for controlling evaporator performance including means defining a passage between said evaporator and said absorber for flow of water vapor therebetween; and means for regulating the pressure drop through said passage from said evaporator to said absorber, said regulating means comprises damper means operable to variably throttle the water vapor flowing through said passage.

2. An absorption refrigeration machine as defined in claim 1 in which a cylinder-and-piston device operates said damper means.

3. An absorption refrigeration machine as defined in claim 1 including a shell; a first tube bundle in said shell cooperating therewith to form an absorber; a second tube bundle in said shell disposed above said first tube bundle and cooperating with said shell to form an evaporator; a container for said second tube bundle and having side walls, and a bottom wall providing a pan for collecting refrigerant liquid, said side walls being formed to provide said passage-defining means, and said regulating means including damper means mounted on said container and movable relative to said passage to control the volume of water vapor flowing through said passage from said evaporator to said absorber.

4. An absorption refrigeration machine as defined in claim 3 in which said damper means is pivotally mounted on said container for movement toward and from said passage.

5. In an absorption refrigeration machine as defined in claim 4 in which a cylinder-and-piston device operates said damper means, one of the cylinder and piston being connected to said container, and the other of the cylinder and piston being connected to said damper means.

6. An absorption refrigeration machine as defined in claim 1 wherein said damper means is operated in response to refrigerant temperature.

7. An absorption refrigeration machine as defined in claim 1 wherein said damper means is operated in response to chilled water temperature.

8. An absorption refrigeration machine as defined in claim 1 wherein said damper means is controlled in response to the level of solution in said absorber.

9. An absorption refrigeration machine as defined in claim 1 wherein said damper means is controlled in response to condensing water temperature.

10. An absorption refrigeration machine as defined in claim 1 wherein said damper means is controlled in response to the level of refrigerant in said evaporator.

* * * * *